United States Patent [19]

Rickenbach et al.

[11] Patent Number: 5,165,092
[45] Date of Patent: Nov. 17, 1992

[54] METHOD OF PROCESSING THE SIGNALLING INFORMATION WITHIN CONFIGURABLE MULTIPLEXERS

[75] Inventors: Hans E. Rickenbach, Zurich; Michael Zumsteg, Lengnau, both of Switzerland

[73] Assignee: Alcatel NV, Netherlands

[21] Appl. No.: 629,128

[22] Filed: Dec. 18, 1990

[30] Foreign Application Priority Data

Dec. 19, 1989 [CH] Switzerland .......................... 4551/89

[51] Int. Cl.$^5$ ............................................... H04J 3/12
[52] U.S. Cl. .................................. 370/110.1; 370/68.1
[58] Field of Search ............... 370/110.1, 60, 67, 85.8, 370/68.1, 58.1

[56] References Cited

U.S. PATENT DOCUMENTS

| | | | |
|---|---|---|---|
| 4,358,845 | 11/1982 | de Passoz | 370/110.1 |
| 4,486,878 | 12/1984 | Havermans | 370/60 |
| 4,546,469 | 10/1985 | Favrel et al. | 370/110.1 |
| 4,726,017 | 2/1988 | Krum et al. | 370/85.8 |
| 4,787,081 | 11/1988 | Waters et al. | 370/67 |
| 4,839,888 | 6/1989 | Baltz et al. | 370/68.1 |
| 4,967,411 | 10/1990 | Grover | 370/110.1 |

*Primary Examiner*—Douglas W. Olms
*Assistant Examiner*—T. Samuel
*Attorney, Agent, or Firm*—Ware, Fressola, Van Der Sluys & Adolphson

[57] ABSTRACT

In configurable intelligent primary multiplexers the individual 64 kbits/s channels of several incoming and outgoing PCM-links are are to be re-arranged with the aid of a commercially available integrated circuit in such a manner that the desired channel configuration is achieved. The signalling information belonging to the individual channels is transmitted for all intelligence channels of a link in the time slots No. 16 of the superframe, each time slot containing the signalling information of two channels. In order to be able to perform the re-arrangement of the signalling information in parallel to that of the intelligence channels without the continuous help of a processor the signalling bit stream lined-up by an ancillary device is converted in such manner that the signalling information of the individual 64 kbit/s channels is in identically numbered time slots as they are allocated to the corresponding intelligence channels. For this reason the signalling information belonging to the intelligence channels 16-30 is stored in a shift register (SR1) at the input side and read out at the time slots corresponding to said intelligence channels. At the output side the lastnamed signalling information is stored in an analogous manner in a shift register (SR2) in order to be interleaved during the next frame with the signalling information of the intelligence channels 1-15.

7 Claims, 2 Drawing Sheets

METHOD OF PROCESSING THE SIGNALLING INFORMATION WITHIN CONFIGURABLE MULTIPLEXERS

BACKGROUND OF THE INVENTION

1. Field of the Invention

The present invention relates to a method for the channel-synchronous switching of the signalling information within configurable digital multi-plexers to which a number of incoming and outgoing PCM-links are connected with a frame structure of M time slots each of P bits which time slots have to be re-arranged wherein for each of said links there is used at least one time slot for the transmission of a synchronizing signal or of a notification word and at least one time slot for the transmission of the signalling information of the intelligence channels occupying the remaining time slots wherein in each signalling time slot of a frame there is transmitted the signalling information of two intelligence channels and wherein with the aid of an ancillary equipment at the input side the contents of the signalling time slots of a superframe are lined-up to a signalling bit stream and are split-up at the output side onto the time slots used for signalling. The invention relates further to a circuit arrangement for carrying out said method.

2. Description of the Prior Art

In digital trunk networks there is set the task to re-arrange at nodal exchanges arbitraryly the individual channels or time slots of the connected PCM-links in accordance with a desired network configuration, wherein said configuration remains fixed during a shorter or longer period of time and the PCM-links of one local destination can by combined to a higher order multi-plex.

The following description relates exclusively to PCM-links which are provided for each direction of transmission with a separate path each with 32 channels of 64 kbit/s, corresponding to a bit rate of 2×2048 kbit/s. 30 channels of said 32 channels are used for the transmission of speech bytes, one channel (time slot No. 0) is reserved for synchronization purposes and the transmission of a notification word and one channel (time slot No. 16) is used as signalling channel.

To those skilled in the art it is obvious that the following description may be applied also to multiplexes with another, especially higher number of channels. This is true as long as the re-arrangement can be executed at the time slot level, i.e. that only one intelligence channel is provided per time slot and that during each signalling time slot of a frame the signalling information of two intelligence channels is transmitted.

The re-arrangement of individual time slots leads to a re-arrangement of the time slots within the multiplexes of the individual PCM-links. To each of said time slots there belongs a signalling information which is separately transmitted for the channels of one PCM-link over its time slots No. 16 according to CCITT protocol No. 7.

The through-switching and new formation of the multiplexes is performed by so-called intelligent primary multiplexers being able to arbitrarily exchange the individual 64 kbit/s channels of several incoming and outgoing 2.048 Mbit/s signals, in the following called 2 Mbit/s signals. There are used mainly commercially available integrated circuits as through-switching elements which elements are able to re-arrange complete bytes. Said bytes are identical with the data words of the time slots of the 2 Mbit/s frame structure according to CEPT standards.

By an ancillary equipment the incoming 2 Mbit/s signal is usually subdivided into two new bit streams which have again the CEPT frame structure with 32 time slots of 8 bits each. One of said bit streams is identical in its structure with the incoming 2 Mbit/s signal where a distinctive time slot is allocated to each 64 kbit/s channel. The other bit stream contains within one frame the lining-up of all time slots No. 16 of one CEPT superframe and thus the signalling information of all 30 intelligence channels, each with 64 kbit/s.

But each byte corresponding to a time slot of the above second named bit stream contains the signalling information of two channels. Therefore it is not possible to have re-arranged these signalling bytes by the through-switching element in the same manner than the speech bytes.

A known solution of the above problem is usually inherently given by the through-switching element by the provision of a processor conform interface allowing the access to each individual incoming and outgoing bit. With the aid of said interface it is possible to read out the signalling information as 8 bit words, to store them in a buffer store and to re-insert the signalling information as a newly arranged 4 bit word into the correct half time slot of the outgoing bit stream.

This solution results in a heavy load of the processor which load increases with increasing frequency of change of the signalling information of the incoming channels. Depending on the working capacity of the processor this may lead to a distortion of the signalling information with simultaneous changes of condition of several signalling words.

To lower said processor load there was already used a solution (Newbridge) wherein with the aid of additional hardware changes of condition of signalling words are detected so that the processor was discharged from the continuous comparison between old and new signalling information and had to be active only when signalling bits have to be changed and/or when due to a new configuration of the network the re-arranging addresses have to be changed.

SUMMARY OF THE INVENTION

It is therefore an object of the present invention to provide a method for the channel-synchronous switching of the signalling information in a digital primary multiplexer avoiding the above mentioned drawbacks.

The method according to the invention is characterized in that the signalling bit stream is changed in its format in such a manner that it contains—distributed over one frame—the signalling information in channel-synchronism with the intelligence channels, that the so formed new signalling bit stream is re-arranged identically with the intelligence information bit stream, and that the re-arranged signalling bit stream is reconverted into the original format.

DESCRIPTION OF THE DRAWINGS

The invention will be best understood from the following description of an embodiment taken in conjunction with the accompanying drawing in which.

DETAILED DESCRIPTION OF THE PREFERRED EMBODIMENT

Figure 1:
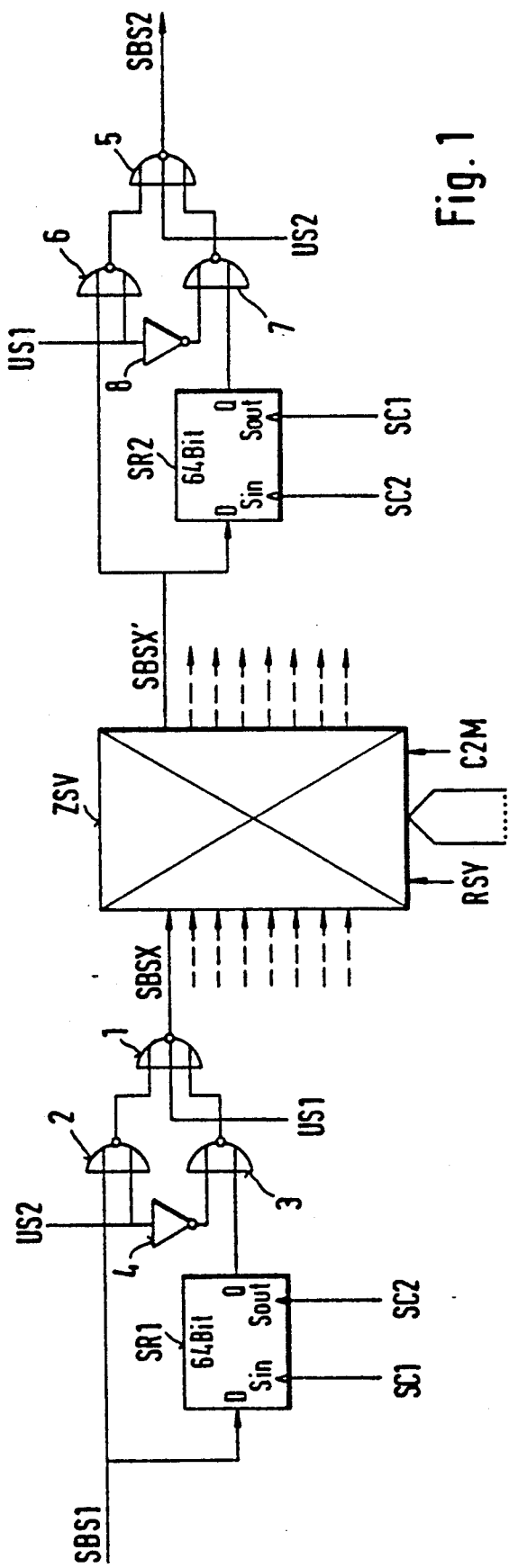
FIG. 1 shows a block diagram of the inventive circuit arrangement for the channel-synchronous switching of the signalling information.

The following description is strongly limited to one direction of transmission. The procedures for the other direction of transmission using a separate path are absolutely identical so that a special description seems unnecessary. The circuit arrangement shown in FIG. 1 comprises a time slot distributor ZSV, at the input side thereof a shift register SR1 and a switch logic consisting of NOR gates 1-3 and of an inverter 4 and at the output side thereof a shift register SR 2 and a switch logic consisting of NOR gates 5-7 and of an inverter 8. The time slot distributor ZSV is, as already mentioned, a commercially available integrated circuit to which—in the present embodiment—both at the input side and at the output side there may be connected eight 2 Mbit/s PCM-links each of 32 channels or time slots. The distributor ZSV is able to be configured by a program in such a manner that each of the 8×32=256 bytes arriving at the input side can be outputted in an arbitrary time slot of the eight PCM-links connected to the output side.

As already mentioned the same integrated circuit is used as time slot distributor for the speech bytes. The following description will explain the manner by which with the aid of the circuit arrangement according to FIG. 1 it can be achieved that the signalling information can be re-arranged in exactly the same manner as the speech bytes, i.e. that the distributor ZSV can be loaded with the same program for the configuration as that used for the speech bytes and can be operated with the same control signals in synchronism therewith.

Figure 2:
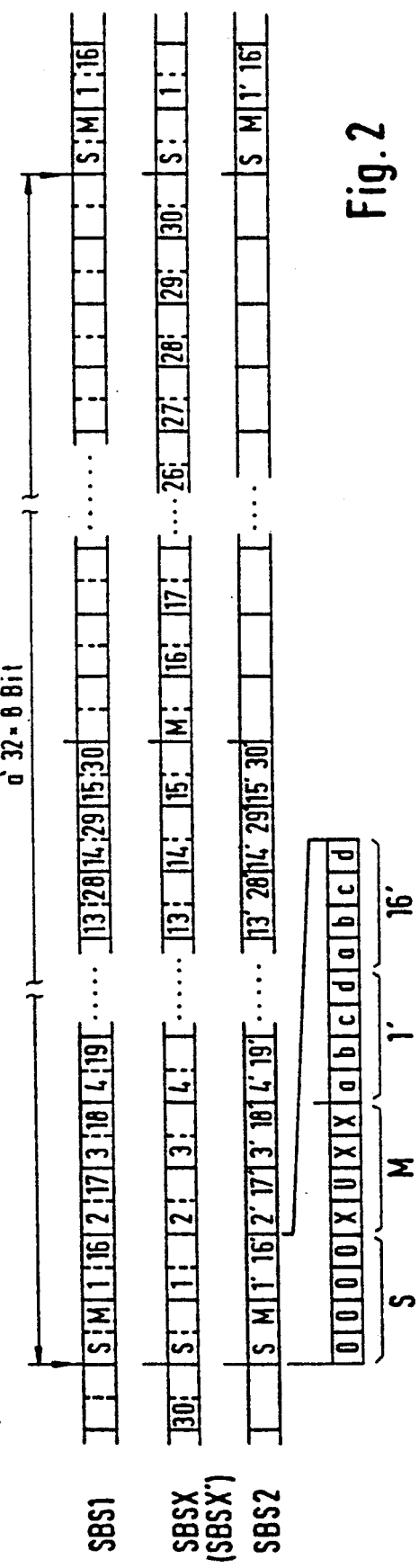
FIG. 2 shows the frame structure of the lined up signalling bit stream before, within and after the circuit arrangement according to FIG. 1.

The signalling bit stream SBS1, generally shown in FIG. 2a and resolved into bits in FIG. 3a, contains in a lined up manner the contents of the time slots No. 16 of a superframe of the line signal. Since as already mentioned each time slot No. 16 contains the signalling information of two speech channels, i.e. 4 bits per speech channel, said lining-up including a sync word S and a notification word M fills half a frame only. The bit stream SBS1 is applied in parallel to the shift register SR1 and to the input-sided switch logic. Control signals SC1 and US2 (FIGS. 3f and 3e) ensure that each time the first four bits of each signalling byte are transferred directly to the distributor ZSV whereas each time the second four bits of each signalling bytes are written into the shift register SR1 whereby simultaneously a signal US1 (FIG. 3d) applied to NOR gate 1 blocks this gate for the input into the distributor ZSV during said four bits. In this manner there originates the first half of the bit stream SBSX shown in FIG. 2b. In the middle of the frame—indicated by a somewhat longer separation line—the signal US2 changes its condition so that NOR gate 2 is blocked and NOR gate 3 is enabled. With the aid of the signal SC2 (FIG. 3g) four bits are read out of the shift register and applied to the distributor ZSV again at the position of the first four bits of each signalling byte. Again the signal US1 ensures that NOR gate 1 is blocked during the second four bits. In this manner the second half of the now complete bit stream SBSX is generated in which the signalling information has the same standardized CEPT frame structure as it is used for the speech channels. The signals shown in FIGS. 3b and 3c are used to synchronize and clock the distributor ZSV.

At the output side of the distributor ZSV there appears the bit stream SBSX' which has exactly the same format as the bit stream SBSX, but with changed information due to the re-arrangement within the distributor ZSV. Said bit stream SBSX' has to be brought for the further handling again into the structure provided for signalling, i.e. each of the time slots No. 0-15 has to contain again the signalling information of two channels. This is done by exactly the same circuit arrangement and with the aid of the same control signals as at the input side, only the connections of the signals SC1, SC2 and US1, US2, respectively, being interchanged.

The signals US1 and US2 allow the direct passage of the respective first four bits of each time slot No. 0-15, i.e. of the first half of the frame, whereas the signal SC2 controls the writing in of the 4 bit packets of the second half of the frame of the bit stream SBSX' into the shift register SR2 whereby the signal US2 at NOR gate 5 simultaneously ensures that the latter is blocked during the second half of the frame. Signal SC1 controls the reading out of the shift register SR2 whereby signal US1 simultaneously blocks NOR gate 6 and enables NOR gate 7 via the inverter 8. The result is the signalling bit stream SBS2, shown in FIG. 2c, which has the same format as the original stream SBS1.

Since the integrated circuit used as the time slot distributor serves several (eight in FIG. 1) incoming and outgoing bit streams which all are in time synchronism with respect to their frame structure there it is possible to use both at the input and at the output sides a respective FI-FO register (First-In, First-Out) of corresponding width (in the present embodiment with eight parallel paths). The processing of the different bit streams is performed for all paths in a parallel manner and simultaneously with the same clock signals.

Figure 3:
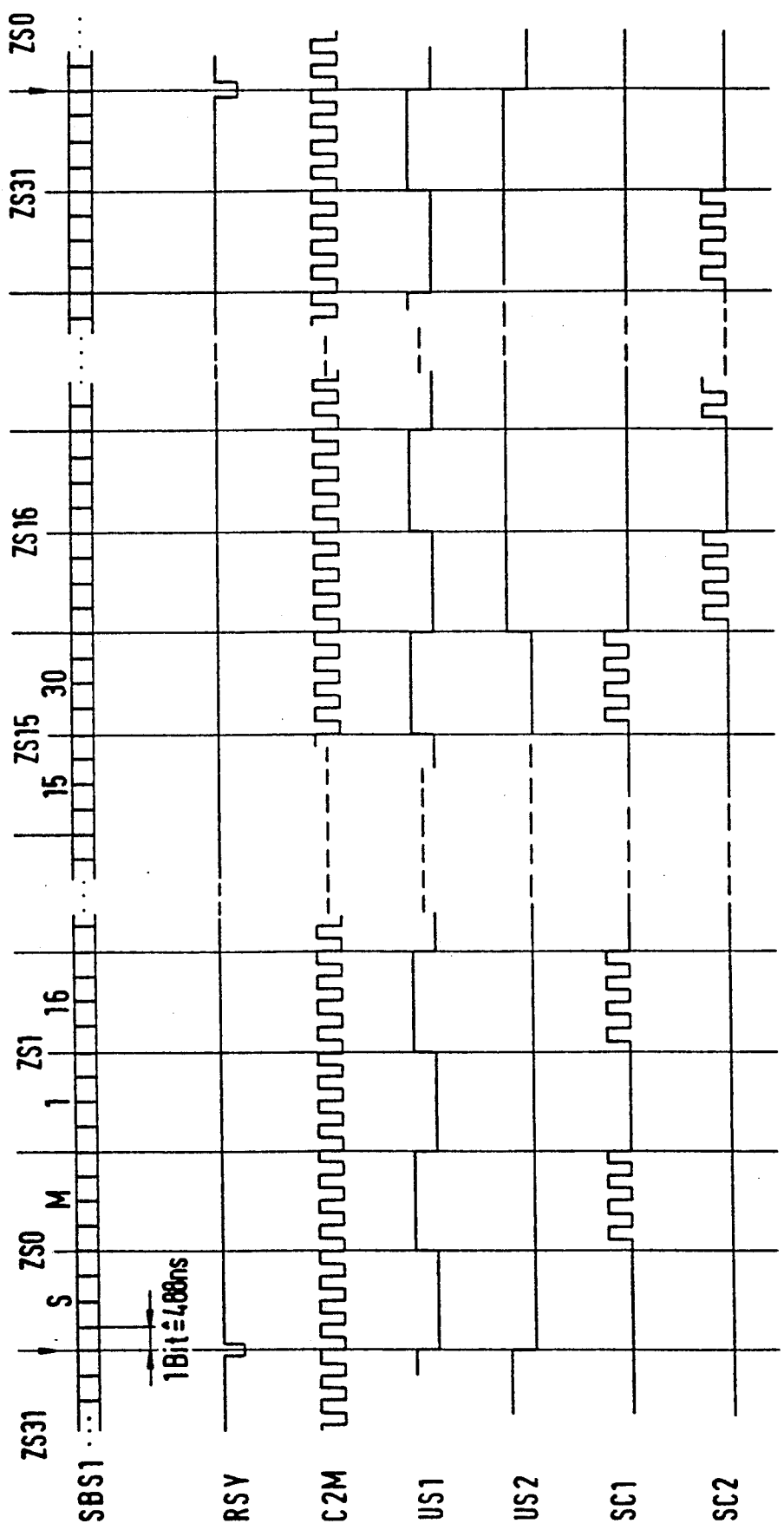
FIG. 3 shows a diagram of the signals used to control the circuit arrangement according to FIG. 1.

The control signals shown in FIG. 3 are examples. The writing and reading clock signals have possibly to be inverted in response to the type of shift register. It may also be possible to omit the switch controlled by the signals US1 and US2, respectively, since sometimes the output of the shift register can be switched directly.

We claim:

1. A method for switching signalling information belonging to individual message channels of a PCM-link in a channel-synchronous manner within configurable digital multiplexers to which a number of incoming and outgoing PCM-links are connected each having a frame structure of M time slots each of P bits and M/2 frames forming a superframe, which time slots have to be re-aligned wherein for each of the PCM-links there is used at least one time slot for the transmission of a synchronizing signal or of a word with a nationally allocated meaning and there is used at least one time slot for the transmission of the signalling information of the message channels occupying M-2 remaining time slots of a frame wherein in each signalling time slot of a frame there is transmitted the signalling information of two message channels so that the signalling information of the M channels of a PCM-link is distributed over one superframe and wherein with the aid of an ancillary equipment at the input side the signalling bits of the signalling time slots of a superframe are lined-up to a signalling bit stream and are split up at the output side onto the time slots used for signalling, characterized in that the signalling bit stream (SBS1) is changed in its format in such a manner that the signalling information of each time slot occupies an identically numbered time slot as the time slot it belongs to so that it is in channel-synchronism with the message channels, that the so formed new signalling bit stream (SBSX) is realigned identically with the message information bit stream, and that a realigned signaling bit stream (SBSX') is reconverted into a signalling bit stream (SBS2) having a format the same as the SBS1 bit stream.

2. The method of claim 1, wherein the signalling bit stream (SBS1) is converted into the new signalling bit stream (SBSX) containing the signalling information distributed over the whole frame and in channel-synchronism with the message channels by leaving respective first packets of Q bits in each time slot of a first half of the frame, where Q=P/2, by storing respective second packets of Q bits of each time slot of the first half of the frame in a buffer store and by reading out the store contents in packets of Q bits at the Q bit positions of time slots of a second half of the frame, and that the re-aligned signalling bit stream (SBSX'), received after re-alignment, is reconverted into the (SBS2) signalling bit stream having the same format as the SBS1 bit stream by leaving the signalling information contained in the first half of the frame, by storing the signalling information contained in the second half of the frame in a buffer store and by reading out the store contents in packets of Q bits in the first half of the next frame, this reading out from the buffer store being respectively performed at the second Q bit positions of each time slot.

3. Method according to claim 2, characterized in that there are chosen M=32 and P=8.

4. Apparatus, comprising:
  a nonblocking re-alignment integrated circuit (ZSV) responsive to N incoming PCM-links, each link having frames of M words of P bits each, for providing N×M re-alignments for incoming P bit words in N outgoing PCM-links also having frames of M words of realigned P bit words, and input- and output- sided First-In-First-Out (FIFO) storage means (SR1, SR2) with a memory size of M×P/4 bits and with at least N parallel paths for storing signalling words for channel-synchronizing signalling information prior to re-alignment and for storing signalling words for forming a signalling channel after re-alignment.

5. The apparatus of claim 4, wherein for enabling and disabling the data transfer at the outputs of the input and output sided stores (SR1, SR2) there is provided a switch logic each consisting of NOR gates (1-3, 5-7) and an inverter (4, 8).

6. Apparatus, responsive to a first bit stream in a frame having M time slots of P bits each, with the first M/2 time slots each having synchronizing and signalling information extracted from a pulse code modulated (PCM) signal in a second bit stream having a repetitive superframe structure made up of a selected number of frames, each frame having M time slots of P bits each for speech, synchronizing and signalling information, and wherein the signalling information for two of the M time slots of each frame is transmitted in one of the time slots of each of the frames of the superframe for rearranging the speech, synchronizing and signalling information in different time slots by means of a time slot distributor, comprising:
  means, responsive to the first bit stream, for providing a rearranged first bit stream with part of the signalling information from each of the M time slots of the first bit stream inserted into the second M/2 time slots such that the signalling information in each time slot corresponds to a time slot in the frames of the second bit stream, and for providing the rearranged first bit stream to the time slot distributor; and
  means, responsive to a signal identical in format to the rearranged first bit stream from the time slot distributor for providing a bit stream in a frame having the same structure as the first bit stream.

7. Apparatus, for providing channel synchronous signalling information to a time slot distributor (TSD) and for receiving rearranged channel synchronous signalling information from the TSD for providing channel-associated signalling, comprising:
  first shift register means (SR1), responsive to M bytes of an M byte input signal (SBS1) and to a store signal (SC1), for storing a second nibble of each byte during a first M/2 bytes of the SBS1 signal and responsive to an output signal (SC2), for providing the stored selected nibbles as a stored nibble signal during a second M/2 bytes of the SBS1 signal;
  first gating means, responsive to the SBS1 signal, to the stored nibble signal and to gating signals (US1, US2), for providing the first nibble of the first M/2 bytes of the SBS1 signal in the first M/2 bytes of an M byte output signal (SBSX) and for providing the second nibble of the first M/2 bytes of the SBS1 signal in the second M/2 bytes of the SBSX signal, the first and second M/2 bytes comprising the channel synchronous signalling information provided to the TSD;
  second shift register means (SR2), responsive to the rearranged channel synchronous signalling information from the TSD in the form of an SBSX' signal and to a store signal (SC2), for storing a first nibble of each byte of the SBSX' signal during a second M/2 bytes thereof; and
  second gating means, responsive to a first M/2 bytes of the SBSX' signal, to the stored first nibbles of the SBSX' signal and to the gating signals (US2, US1), for pairing in the first M/2 bytes of an M byte output (SBS2) signal, the first nibble of each of the first M/2 bytes with the first nibble of the second M/2 bytes of the SBSX' signal.

* * * * *